US010071912B2

(12) United States Patent
Schulte et al.

(10) Patent No.: US 10,071,912 B2
(45) Date of Patent: Sep. 11, 2018

(54) CARBON NANOMATERIAL

(71) Applicants: TuTech Innovation GmbH, Hamburg (DE); Technische Universitat, Hamburg (DE)

(72) Inventors: Karl Schulte, Hamburg (DE); Matthias Mecklenburg, Hamburg (DE)

(73) Assignees: TuTech Innovation GmbH Patentverwertungsagentur, Hamburg (DE); Technische Universitate, Hamburg (DE)

( * ) Notice: Subject to any disclaimer, the term of this patent is extended or adjusted under 35 U.S.C. 154(b) by 1411 days.

(21) Appl. No.: 13/915,971

(22) Filed: Jun. 12, 2013

(65) Prior Publication Data
US 2014/0162001 A1 Jun. 12, 2014

(30) Foreign Application Priority Data
Dec. 12, 2012 (DE) .................. 20 2012 011 892 U

(51) Int. Cl.
*C23C 16/01* (2006.01)
*C01B 31/04* (2006.01)
(Continued)

(52) U.S. Cl.
CPC ............ *C01B 31/04* (2013.01); *B82Y 30/00* (2013.01); *C01B 31/0206* (2013.01);
(Continued)

(58) Field of Classification Search
CPC ........ B82Y 30/00; B82Y 40/00; H01M 4/625; H01M 8/0213; H01M 8/0234; B29C 65/528; C01B 31/0206; C01B 31/04
See application file for complete search history.

(56) References Cited

U.S. PATENT DOCUMENTS

| 2009/0186214 A1* | 7/2009 | Lafdi ............. B82Y 30/00 428/336 |
| 2011/0124790 A1 | 5/2011 | Penicaud |
| 2012/0034442 A1 | 2/2012 | Pauzauskie et al. |

FOREIGN PATENT DOCUMENTS

| DE | 68926494 T2 | 10/1996 |
| EP | 0374855 A2 | 6/1990 |
| WO | 2009054995 A1 | 4/2009 |
| WO | 2011116751 A2 | 9/2011 |
| WO | 2012138803 A2 | 10/2012 |

OTHER PUBLICATIONS

Rho, et al., "Growth and Characterization of SiOx nanowires by VLS and SLS growth mechanism," *Mater. Res. Soc. Symp. Proc.*, vol. 832, (2005), pp. F7.17.1-F7.17.5.
(Continued)

*Primary Examiner* — Stella Kim Yi
(74) *Attorney, Agent, or Firm* — Kilpatrick Townsend & Stockton LLP; Dean W. Russell

(57) ABSTRACT

The invention relates to a carbon-containing nanomaterial comprising, in particular made up as, a network of carbon wall structures which enclose open or closed voids which has a density which can be as low as 0.2 mg per cm3 or lower. The nanomaterial of the invention is made up as a network of carbon wall structures. The carbon wall structures can be tubular, rod-like or in the form of webs or the like which have varying thickness and thus form a network structure, in particular a three-dimensional network structure constructed in the manner of a sponge.

22 Claims, 2 Drawing Sheets

Figure 1:
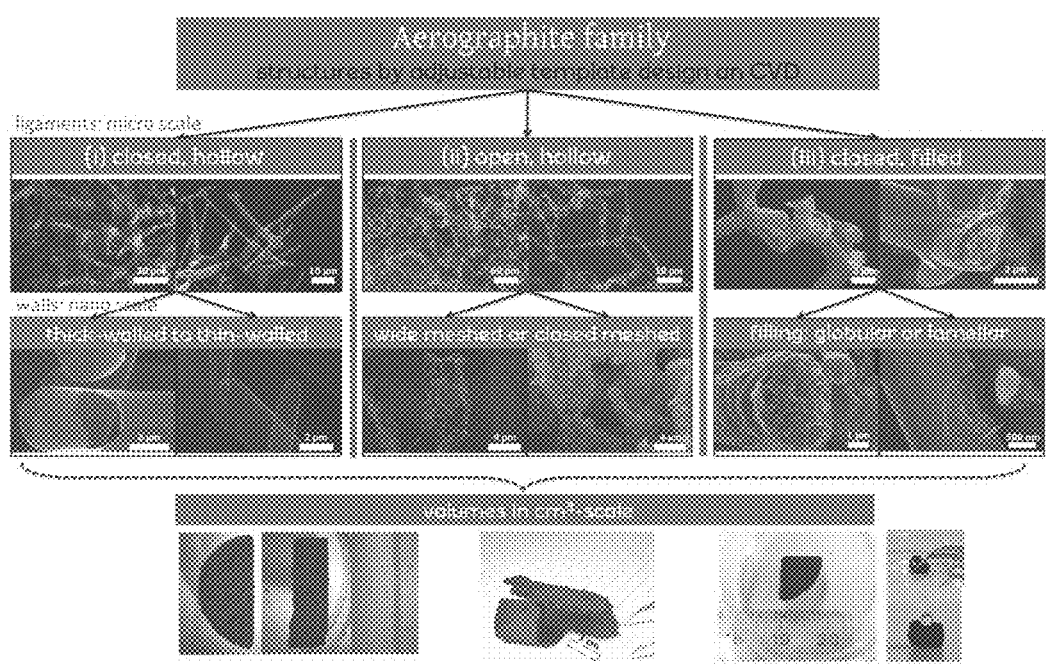

(51) Int. Cl.
  *B82Y 30/00* (2011.01)
  *G01J 5/52* (2006.01)
  *H01G 11/36* (2013.01)
  *H01G 11/86* (2013.01)
  *C01B 31/02* (2006.01)
  *B82Y 40/00* (2011.01)
  *C02F 1/461* (2006.01)
  *C02F 1/467* (2006.01)
  *H01M 4/587* (2010.01)
  *H01M 4/62* (2006.01)
  *H01M 8/0213* (2016.01)
  *H01M 8/0234* (2016.01)
  *B01J 21/18* (2006.01)

(52) U.S. Cl.
  CPC .............. *G01J 5/522* (2013.01); *H01G 11/36* (2013.01); *H01G 11/86* (2013.01); *B01J 21/18* (2013.01); *B82Y 40/00* (2013.01); *C02F 1/4672* (2013.01); *C02F 1/46109* (2013.01); *C02F 2001/46133* (2013.01); *C02F 2305/08* (2013.01); *H01M 4/587* (2013.01); *H01M 4/625* (2013.01); *H01M 8/0213* (2013.01); *H01M 8/0234* (2013.01); *Y02E 60/13* (2013.01); *Y10T 428/13* (2015.01)

(56) References Cited

OTHER PUBLICATIONS

Hsu, et al., "Dye-sensitized solar cells using ZnO tetrapods," *Journal Applied of Physics*, American Institute of Physics, New York, US, vol. 103. Nr. 8, Apr. 24, 2008 (Apr. 24, 2008), pp. 83114-83114, XP012110499, ISSN: 0021-8979, DOI: 10. 1063/1. 2909907).

Kitano, el al., "Growth of large tetrapod-like ZnO crystals—I. Experimental considerations on kinetics of growth," *Journal of Crystal Growth*, Elsevier, Amsterdam, NL, vol. 102, Nr. 4, Jun. 1. 1990 (Jun. 1, 1990), pp. 965-973, XP024473572, ISSN: 0022-0248, DOI: 10.1016/0022-0248(90)90867-K).

Mecklenburg, et al., "Aerographite: Ultra Lightweight, Flexible Nanowall, Carbon Microtube Material with Outstanding Mechanical Performance," *Advanced Materials*, 24:3486-3490 (2012).

Özgur, et al., "A comprehensive review of ZnO materials and devices," *J. Appl. Phys.*, vol. 98, (2005), pp. 041301-041301-103.

Riaz, et al., "Buckling and elastic stability of vertical ZnO nanotubes and nanorods," *J. Appl. Phys.* (2009), pp. 034309-034309-6.

Zhong, et al., "Fabrication of multilayer graded density peeled-carbon-aerogel target," *Fusion Engineering and Design*, 86:238-243 (2011).

* cited by examiner

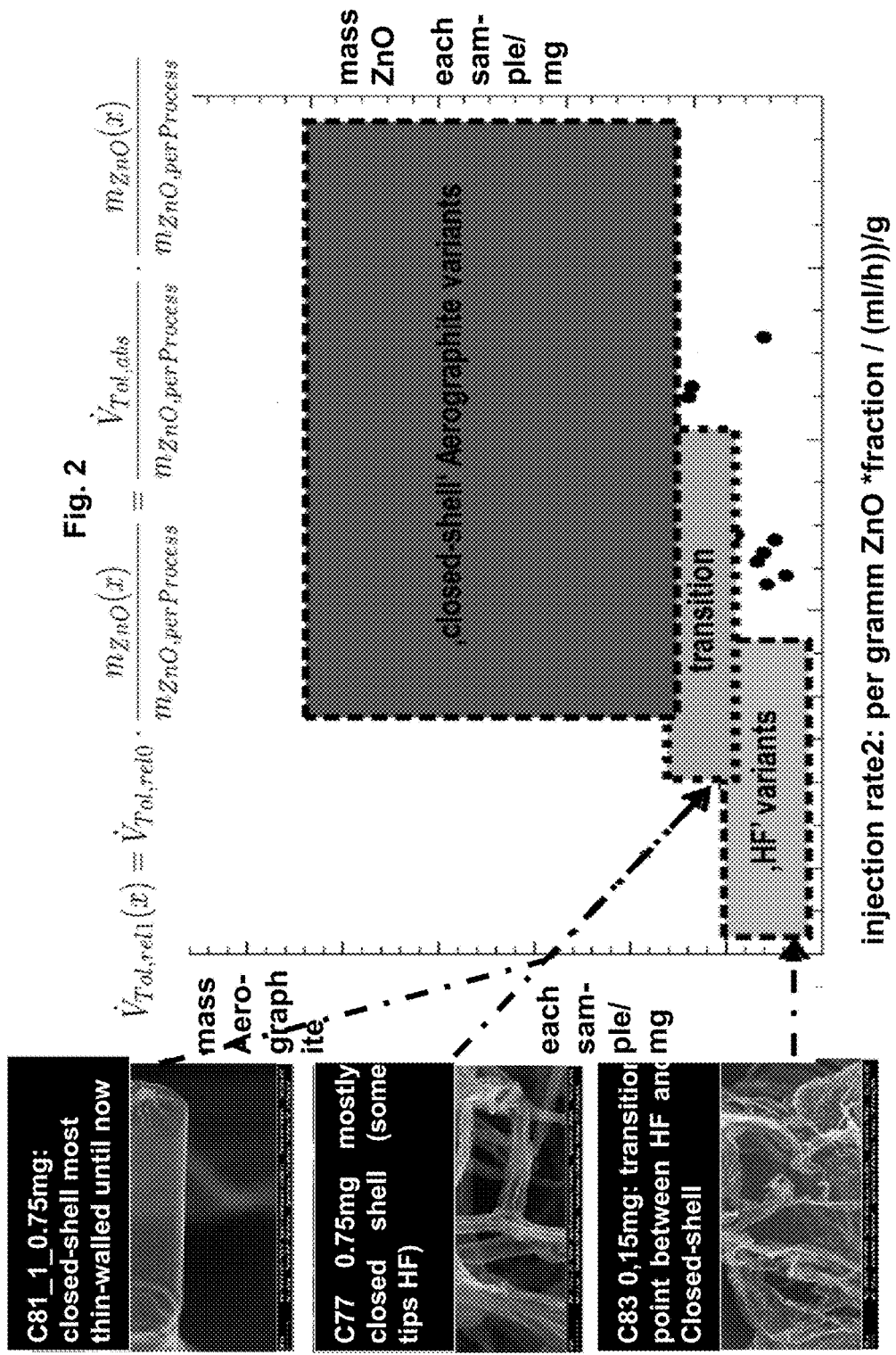

CARBON NANOMATERIAL

This application claims priority from DE202012011892U filed on Dec. 12, 2012 by the same applicants, the disclosure of which is herewith fully incorporated by reference.

The invention relates to a carbon-containing nanomaterial comprising, in particular made up as, a network of carbon wall structures which enclose open or closed voids.

Carbon nanomaterials such as carbon nanotubes are materials which are made up of microscopic carbon structures whose dimensions are in the nanometer range, i.e. below one micron. For the purposes of the present description, a nanomaterial is a material which is formed by a material having a microscopic internal construction of structures which have a dimension of less than 100 nanometers in at least one direction in space. For the purposes of the invention, a nanomaterial can therefore have external dimensions in the mm or cm range or even above. The internal microscopic geometry of the nanomaterial can likewise be formed by structures which have a longitudinal dimension and optionally also a lateral dimension of more than 100 nanometers, optionally also in the range of microns or two- or three-decimal place micron dimensions. In comparison, however, the nanomaterial according to the invention is defined by a dimension in at least one spatial direction of these structures which is below 100 nanometers; this dimension is typically the wall thickness or diameter of the band- or rod-like structures which form the nanomaterial in typical embodiments.

Owing to excellent bonding forces and structural strength properties, these carbon nanomaterials can achieve absolute and specific materials properties which cannot be achieved with other materials customary today. Thus, tensile strengths in the range of a number of GPa have been achieved for carbon nanotubes, extraordinarily low density properties of up to 2 mg per $cm^3$ have been achieved for graphite networks while various carbon nanomaterials have an extraordinarily low electrical resistance or extraordinarily high electrical conductivity which qualify them as electrode material for use in high-performance batteries or for high-performance capacitors.

Present-day research and development is directed at achieving a further improvement in materials properties both in absolute terms and in specific terms, i.e. in the form of absolute individual values and in the form of individual material properties based on basic properties of a material, for example the density, in order to provide substances and materials by means of which outstanding properties and capabilities can be achieved in microsystem applications, for coating applications, electric circuits, filter systems for fluid, medical and bio applications, optical instruments and components, sensors, batteries, supercapacitors or macroscopic structures.

It is an object of the invention to provide a carbon-containing nanomaterial which has advantageous properties compared to nanomaterials known at present.

The invention provides a carbon-containing nanomaterial of the type described at the outset, which has a density which can be as low as 0.2 mg per $cm^3$ or lower. The nanomaterial of the invention is made up as a network of carbon wall structures. The carbon wall structures can be tubular, rod-like or in the form of webs or the like which have varying thickness and thus form a network structure, in particular a three-dimensional network structure constructed in the manner of a sponge. This network can enclose open or closed voids, i.e. be configured as an open-pored or closed-pored material or a combination thereof. Here, an open-pored structure is a structure in which the individual void sections are interconnected; in contrast, a closed-pored network structure is characterized by voids which are separated from one another and are not connected.

The outstandingly low density of the nanomaterial of the invention makes it possible to achieve particularly advantageous specific properties; in particular, the density-based strength and conductivity of the nanomaterial allows particularly advantageous, high values to be achieved.

Particular preference is given to the network consisting of a plurality of carbon tube structures which are preferably completely or essentially randomly arranged and cross-linked with one another to form a three-dimensional structure. Such an irregular network structure without a preferential orientation or only a weak preferential orientation results in advantageous properties under load in all three directions in space of the nanomaterial, which makes the nanomaterial, as structure-supporting material, particularly suitable for absorbing and transmitting forces in any direction; i.e. it is macroscopically isotropic in the uncompressed original state. Additionally the direct crosslinking of inner graphite elements provides a coherent electrically conductive network, which pathways cannot be interpenetrated by e.g. interpenetrating polymer or other solid, fluid or gaseous material. Additionally a high specific surface area is given for the open porous carbon structure. Graphite is known to be chemically very stable to many acids or solvents. Due to the combination of the structural properties a use as electrically conductive filler material, battery electrode material and liquid or gaseous filter material is suggested. Due to the properties of few-layered graphite and the highly porous structure, applications as EMF shielding and absorption of electromagnetic waves in optical spectra could be feasible.

Particular preference is given to the carbon tube structures to have a closed wall structure. As a result of such a closed wall structure, each individual tube within the total carbon structure is provided with a geometry which is advantageous in respect of the area-based inertia under any bending or shear stress, which gives the network good performance in any loading direction.

Furthermore, the carbon tube structures are preferably hollow and gas-filled. The configuration of the carbon tube structures as hollow and gas-filled nanotubes leads to a particularly light material which is at the same time able to withstand stress.

As an alternative, the carbon tube structures can be hollow and filled with a preferably highly porous graphitic solid-state structure. As a result of filling of the carbon nanotubes with a solid-state structure, in particular a sponge-like solid-state structure, the sensitivity of the nanotubes to kinking, denting or other forms of failure can be significantly reduced with a slight increase in weight and a material which still has a high structural strength is created. In particular, the internal surface area of the material is multiplied by such filling compared to the unfilled structure, which can be utilized for absorption and storage FIG. 1: shows SEM-photographs of examples of different structures of the carbon nanomaterial which can be obtained by the method according to the invention.

FIG. 2: shows a diagram demonstrating the correlation between injection rate, mass of the patterned ceramic and the type of nanomaterial resulting from the invention (designated "Aerographite" in the Figure) resulting from such ratio of injection rate and mass of ceramic pattern.

FIG. 1 shows SEM-photographs of examples of different structures of the carbon nanomaterial which can be obtained by the method: All: Highly porous graphite carbon 3d networks with interconnections and removed patterned ceramic which had been used for the carbon deposition. The morphology and wall thickness of graphitic walls can be adjusted accordingly to the described method. Left: (i) "closed shell" structure with nanometer thick graphite walls. Middle (ii): "hollow-framework" structure with an openporous wall morphology inside the porous network. Right (iii): "filled" structure with graphite inner filling inside a closed graphite enclosing shell.

Particular preference is given to this solid-state structure within the carbon tube structures consisting of carbon. This provides a matching materials composition within the nanomaterial for the tube structure and the filling thereof, which is particularly advantageous in terms of thermal expansion properties, cohesion between the filler material and the surrounding tube structure and also manufacturing properties.

In a further preferred embodiment, the nanomaterial is produced by deposition of carbon from the gas phase onto a pattern structure, where the pattern structure preferably comprises a plurality of individual elements, in particular particles with several arms originating from a particle base and orientation in multiple room directions like e.g. tripods or tetrapods, which abut one another at contact points and the carbon grows over these contact points during deposition so that the pattern structure is preferably configured as a contiguous covalently bonded graphite layer. Particles in shape of tripods, tetrapods or all other forms of multi arm particles are preferred. Such a deposition process makes it possible to set a particularly fine structure of the nanomaterial and to match both the microscopic and macroscopic structure of the nanomaterial to a numerous variety of structural demands. The use of a pattern structure makes it possible to predefine the geometry of the nanomaterial produced. This property of the nanomaterial as material deposited from the gas phase enables any geometry which can be produced as pattern structure to be coated with the nanomaterial and any such pattern structure consequently to be replicated as nanomaterial. The nanomaterial produced in this way firstly has essentially hollow structures which are formed by attachment of the carbon deposited from the dense phase to the pattern structure. Although such hollow structures can be filled during the course of the deposition process or in subsequent process steps, they are normally a characteristic feature of nanomaterials produced in this way. The pattern structure itself can be configured in a variety of ways; in particular, it can be provided as sponge-like structure, framework-like structure or as a structure composed of a plurality of individual elements, in order to produce the nanomaterial having a desired microstructure and macrostructure, see FIG. 1. It should be noted that firstly the external geometry which defines the external dimensions of the nanomaterial produced is defined by the pattern structure and secondly the internal, nanostructure of the nanomaterial is also defined by the microscopic structure of the pattern structure. The pattern structure can, in one embodiment of the nanomaterial of the invention, remain as constituent of the nanomaterial. However, particular preference is given to dissolving the pattern structure in the course of the production of the nanomaterial, in particular dissolving this pattern structure in the carbon deposition step. Such dissolution can, for example, be affected by a thermal influence or a chemical reaction or a combination of the two, enabling a hollow structure whose interior space is defined by the original pattern structure, in particular corresponds to the latter, to be ultimately formed.

Here, the deposition can be carried out in a chemical vapour deposition (CVD) process with injection of a carbon-containing starting material, in particular an aromatic hydrocarbon such as toluene or other liquid or gaseous carbon precursors known form chemical vapour depositions of graphitic carbon species, e.g. gases like ethen, ethin, propane, methane or solvents like ethanol, benzene, xylene, butanol. Such a production method enables a particularly pure and physically fine-structured carbon structure which can in this way form graphite or macroscopic volumes as a coherent network of graphitic ligaments. Due to the resembled particle bridges the carbon layers can span continuous from neighbouring particles, which themselves undergo a chemical reaction within the CVD process, which allows their in-process removal. This leaves a continuously and covalently bonded carbon 3d network on the micro and/or nano level For the present purposes, a CVD process is in particular a process in which precipitation and deposition of a solid material from a gaseous phase occurs in a controlled atmosphere at elevated temperature.

Even greater preference is given to the pattern structure consisting of a ceramic material, in particular an oxide ceramic, preferably zinc oxide. The pattern structure normally predetermines the microscopic and macroscopic geometry of the nanomaterial of the invention, as explained above. The invention strives to provide a high variability in respect of this microstructure and macrostructure. The use according to the invention of a pattern structure composed of a ceramic material makes it possible to use production processes for this pattern structure which open up a significantly greater variety of macrostructures and microstructures. Thus, in particular, it is possible to use crystal growth methods and PVD and CVD processes to produce the pattern structure and in this way achieve microscopic and macroscopic geometries of the nanomaterial of the invention which cannot be achieved using other materials of a pattern structure. Ceramic particles allow multiple different geometries and multiple different methods for its manufacturing. Generally, ceramic particles are a proper basis for manufacturing the pattern structure with high porosity using the CVD-processes described herein since bridging between the ceramic particles can be established in such CVD-process by sintering effects. It is generally preferred to use ceramic oxides as a template for manufacturing graphite-patterns according to the invention. One advantage of the use of such ceramic oxides is the ability to directly remove the ceramics in a chemical reduction reaction in the CVD-process. It has been found that zinc oxide in particular is particularly suitable for the pattern structure material because zinc oxide can firstly, in a process known from WO 2011/116751 A2, which is hereby incorporated by reference into the present disclosure, can be shaped to form pattern structures having advantageous microscopic geometries and macroscopic dimensions in the cm range, and secondly the deposition of carbon on zinc oxide can be carried out reproducibly in a CVD process and, in addition, the zinc oxide can be removed by reduction by means of a reducing agent in this CVD deposition process. This makes it possible to produce nanomaterials which consist of pure carbon and have no residues, or only residues which are unavoidable in the manufacturing process, of the material of the original pattern structure, without a complicated subsequent process for removing the pattern structure material being necessary for this purpose.

Even further preference is given to the CVD process proceeding in a reducing atmosphere, in particular in a gas mixture composed of an inert gas and a reducing gas, preferably an argon/hydrogen mixture. This way of producing the nanomaterial enables the pattern structure material to be removed virtually without leaving a residue or actually without leaving a residue from the nanomaterial by means of a reduction operation, making it possible to produce a nanomaterial composed of pure carbon in a one-stage deposition and removal process firstly for the carbon and secondly for the pattern structure material.

Even greater preference is given to the CVD process proceeding at from 750° C. to 800° C., preferably from 750° C. to 770° C., in particular at 760° C. The setting of such temperatures results both in deposition of carbon and also removal of the pattern structure material in a particularly efficient way and to give a geometrically finely defined structure. It should be noted in principle that, depending on the material, other temperatures, in particular higher temperatures, can be advantageous in order to achieve an appropriate result, for example when pattern structure materials which react very sluggishly are used.

It is further preferred to proceed the CVD process at temperatures of more than 800° C., in particular at temperatures exceeding 900° C. In this high temperature processing it is possible to increase the strength of the graphite and its electrical conductivity and to reduce the remaining residues of the template material. In particular when using high temperature resisting ceramic oxides it is preferred to process the material at high temperatures in the CVD process, like e.g. temperatures above 800° C., above 900° C. or even above 1000° C. Higher temperatures are needed for other metal-oxide ceramics to enable the evaporation of the metal constituent of the used patterned ceramic. Other metal-oxide ceramics which can be reduced to a metal residual, which can be removed by gas flows, cold-traps or evacuation, are suggested to be feasible at suitable temperatures for the claimed method, e.g. MgO, $Al_2O_3$, ZnO, ZrO, $ZrO_2$, SnO, $Sn_2O_3$, $SnO_3$, $TiO_2$, BaO, $Y_2O_3$, CaO. This will allow to use a broad variety of ceramics as a template and to thus start the CVD building process on the basis of a large variety of microscopic and macroscopic geometries of such a template selected from different ceramic materials.

Even greater preference is given to the CVD process proceeding, in at least one first phase, in a non-reducing or weakly reducing first atmosphere and in a subsequent second phase in a second atmosphere which reduces more strongly than the first atmosphere. Such a control of the course of the process enables a firstly efficient and good deposition of the carbon material in the first phase to be achieved and a subsequent effective removal of the pattern structure in the second phase to be effected together with simultaneous sealing deposition of carbon on the existing carbon structures. The removal of patterned ceramics is enabled by a chemical reduction and evaporation of metal constituent the used metal-oxide ceramic: The CVD process is carried out in a reducing atmosphere, in particular in a gas mixture composed of an inert gas and a reducing gas, preferably an argon/hydrogen mixture or a chemical reductive atmosphere resulting from the cracking products of the gaseous or liquid carbon precursor itself.

FIG. 2 shows a diagram demonstrating the correlation between injection rate, mass of the patterned ceramic and the type of nanomaterial ("designated Aerographite") resulting from such ratio of injection rate and mass of ceramic pattern. As can be seen, the method allows to built up a tailored carbon wall morphology due to the CVD parameters chosen. The carbon precursor feeding rate relative to the used mass of patterned ceramic enables the selective choice of inner structure and therefore macroscopic material structure and properties.

Structure and some of the properties of some variants of the nanomaterial obtained by the method are described in the publication Mecklenburg, M., Schuchardt, A., Mishra, Y. K., Kaps, S., Adelung, R., Lotnyk, A., Kienle, L., Schulte, K. Aerographite: ultra lightweight, flexible nanowall, carbon microtube material with outstanding mechanical performance. Advanced materials, 24(26), 3486-90. 2012 (hereafter Mecklenburg et al.) and the supporting information hereto which can be found under http://onlinelibrary.wiley.com/store/10.1002/adma.201200491/asset/supinfo/adma_201200491_sm_suppl.pdf?v=1&s=7dacd42767fcfa4025f75403fa1f05b6496838b5: This publication is herewith fully incorporated by reference. Into the disclosure of this description. Below a summary of some aspects of this reference is given.

With the invented method the nanomaterial of the invention can be highly tuned concerning internal structure and the resulting macroscopic properties. It has a tuneable density which can be as low as 0.2 milligram/cubic centimeter, less than 0.18 milligram/cubic centimeter or even lower. Such a structure can be achieved by means of the processes described above and represents a previously unknown combination of excellent materials properties in the form of a particularly low density combined with a particularly high mechanical strength of the structure. It should be noted that the nanomaterial of the invention can, inter alia, be densified by compression without internal structures and connections of the nanomaterial being damaged or destroyed. Such compression enables the density of the nanomaterial to be increased and at the same time the mechanical properties to be improved; in particular, a higher stiffness, tensile strength and compressive strength can be obtained.

Even further preference is given to the nanomaterial having an electrical conductivity of more than 0.2 siemens/meter at a density which can be tailored to less than 0.2 milligram/cubic centimeter in particular 0.18 milligram/cubic centimeter. An excellent property of the nanomaterial of the invention achieved in this way is also present in the provision of a particularly high conductivity combined with a very low density. The nanomaterial of the invention achieves the low weight required, for example, for applications as electrode material in high-performance batteries. The advantageous electrical properties achieved in this way can be obtained in a particularly effective way by the above-described process for producing the nanomaterial of the invention. Here too, it should be noted that densification of the nanomaterial, for example in the course of compression, enables the conductivity of the material to be increased. In a further preferred embodiment of the nanomaterial of the invention, the latter consists of hollow band structures of amorphous carbon (also referred to as "glass-like carbon", "glassy carbon" or else "vitreous carbon"). Such a microscopic structure has been found to be particularly advantageous in respect of the ratio of strength to density, since it makes it possible to produce microscopic rod support structures which are significantly superior to conventional materials in terms of properties such as tensile strength, compressive strength and other mechanical properties.

Finally, particular preference is given to the nanomaterial consisting of a plurality of star structures connected to one another, with each star structure having a plurality of arms extending outwards from a central region, in particular as tripod or tetrapod having three or four arms, respectively, and a star structure at least one end of the arms and/or in at least one region between the central region and the end of the arms with at least one end of the arms and/or at least one region between the central region and the end of the arms being joined to another star structure. Configuration of the nanomaterial in a microscopic structure composed of a plurality of star structures connected to one another in this way has firstly been found to be particularly advantageous in manufacturing terms because such star structures can be achieved by means of some production processes for ceramic support substances and are therefore suitable as an achievable pattern structure for the nanomaterial of the invention. Secondly, such a microscopic structure composed of a plurality of star structures connected to one another allows a high degree of interconnection with numerous bonding points between the individual star structures, as a result of which an overall stiff structure can be achieved. Here, entanglement and clamping effects of the individual star structures with one another and also the numerous contact points which in the case of these geometries inevitably occur between the arms of the individual star structures producing direct bonding effects in the form of van der Waals forces result in an overall very strong internal structure. The particular mechanical, electrical and chemical properties of the material of the invention are based on a direct, mechanical, structural connection between the individual arms. This is due to the graphite planes within the total material and also in the connecting regions between individual elements of which the material of the invention is composed being joined not only via secondary bonds (van der Waals forces) but also being directly structurally joined via intergrown graphite planes, i.e. graphite planes going over into one another, via these bridges and covalent bonding forces thus acting to connect the structure.

As mentioned in Mecklenburg et al. the invention allows to tune the structure to different morphologies by controlled modifications of the method synthesis. All macroscopic aerographite samples contain the interconnection of carbon layers. A so called "closed-shell" graphitic Aerographite with nanometer wall thickness, a hierarchical "hollow framework" variant of the aerographite and graphite filled variants of Aerographite can be obtained by the later described method. As mentioned, different patterned ceramics can be used as also bubble-like shaped exemplars show and the resemble of patterned ceramic can mimic even small sub-micrometer details as surface roughness, which allows to create corrugated carbon walls, which could be beneficial to improve the bending stiffness of inner ligaments. The carbon walls have a wall thickness in the nanometer range (~15 nm) similar to that of thin "multiwall carbon nanotubes" (MWCNTs); however, the hollow structures formed by the walls have diameters in the micron range. Unlike MWCNTs, the relatively large graphite planes are thus relatively less curved by orders of magnitude, which favours the formation/occurrence of many linkage points of the tubes over the former sintering bridges of the now dissolved-out template. It is found, that the thickness of the walls can be adjusted by the carbon feeding rate of the CVD process.

The hollow framework variant is a very low density variant of aerographite. In this variant, a further hierarchical structural level is introduced by the structure of the walls: the open, unfilled framework structure (referred to in future as "hollow framework") is formed by "carbon nanoribbons" (carbon nanobands). These hollow framework structures, a network having a sub-network. In addition the normally hollow tubes can be synthesized with various carbon structures in the interior. The graphitic structure in the interior of these variants gives far greater specific surface areas, but with the disadvantage that flexibility and tolerance to damage is decreased.

The CVD process invented allows a one-step synthesis of a variety of carbon structures with simultaneous and complete removal of the underlying template material. In case of ZnO this is induced by a hydrogen gas flow which reduces ZnO to metallic Zn which in turn vaporizes and precipitates on the exhaust purification system of the CVD reactor.

From the experimental part of reference Mecklenburg et al.: Pattern (template) preparation: The ZnO specimens were produced using a recently discovered method known from WO 2011/116751 A2. Zn powder (particle size 1-5 μm) was mixed with polyvinyl-butyral powder (Kuraray Europe GmbH) in a mass ratio of 1:2. This mixture was heated in a muffle furnace to 900° C. at a heating rate of 60° C. 1/min. After 30 minutes, a loose powder of the typical ZnO tetrapods is obtained. Further synthesis methods and reliable formulations for the production of ZnO structures are known and can be used as an alternative. Compressed powder (densities of from 0.15 g/cm$^3$ to 0.8 g/cm$^3$) was subsequently reheated at 1200° C. in ceramic rings (h=10 mm, d=15 mm) for 3-4 hours in order to form the connections.

From the experimental part of reference [1]: CVD synthesis: The base aerographite variant (hollow, closed graphitic walls) can be obtained by placing ZnO templates in the maximum temperature zone of a 2-zone split tube furnace (fused silica working tube: length=1300 mm, diameter=110 mm), as follows: at a constant temperature profile of 200° C. in the region of injection and 760° C. in the main zone at an argon gas flow (0.02 l min-1, ambient pressure), the injection of toluene at a rate of 5.5 ml min-1 (99% Alfa Aesar) is commenced. With the commencement of injection using a syringe pump, the gas flows are changed for 120 minutes to 0.2 l/min of Ar and 0.02 l/min of hydrogen. A subsequent 45 minute treatment under a pure hydrogen atmosphere (0.6 l/min) without injection is followed by 120 minutes under a mixed Ar/H$_2$ atmosphere (0.2 l/min/0.02 l/min) with injection of toluene. A final hydrogen treatment at 0.6 l/min was carried out for 20 minutes before the furnace was cooled under a stream of pure Ar. The synthesis depends on the template surface area and time-dependent variations of the gas flow or temperature. Thus, the parameters of the lightweight, hollow framework variant are obtained using a reduced 2 ml/min toluene injection for 4 hours with a gas flow of 0.06 l/min of H$_2$ and 0.2 ml/min of Ar and a 1 hour after-treatment without injection and a flow of 0.09 l/min of pure H$_2$ at 800° C. Further findings of the CVD method are following in the text.

The nanomaterial of the invention can, in particular, be used as terminator in high-frequency networks, in particular in network technology satellites, or as radiation-absorbing element for cosmic radiation such as protons, gamma radiation, or as black body, in particular as optical reference for spectrometers and for reducing scattered incoming radiation, or as hydrogen store, or as separation element in fuel cells and other separation membranes in electrochemistry technology, or as filter for fluids (gas and liquid), or as electrode for the oxidation of wastewater residues in wastewater purification, or as sensor for fluids such as gases and liquids, or as substrate for electrically stimulated growth of biological cells, or as electrode material for batteries, accumulators, capacitors or fuel cells, or as material for micromechanical components, in particular vibration-stressed components, or as MEMS, or as polymer composite, or as EMF shielding, in particular as polymer composite, or as carbon-carbon composite, in particular as EMF shielding, tribological material, heat coupling material, or as sensor such as UV sensor in the mixed state with residues of the oxide ceramic ZnO, resistive or capacitive strain sensor as bulk aerographite or aerographite in elastomer, or as nanoactuator/microactuator as bulk aerographite or polymer composite, or for deposition of functional particles/coatings (ALD, sputtering, etc.), or as magnetic sensor, or as material for ALD deposition of magnetic and other functional coatings, or as support material for catalysts, or as coloured material and coating material for functionally active surfaces.

Preferred embodiments are described in more detail in the following description with reference to the figures. Here, the carbon-containing nanomaterial of the invention is referred to as aerographite to aid understanding. It goes without saying that this description does not represent a functional restriction of the properties of the carbon-containing nanomaterial.

A further aspect of the current invention is a method of producing a nanomaterial, comprising the steps:
a) providing a ceramic pattern structure,
b) depositing carbon from the gas phase onto said pattern structure in a deposition process,
c) replicating the pattern structure by an entirely covalently bonded graphite layer in said deposition process,
d) reducing/removal of ceramic pattern whilst/in course of the deposition process.

The method according to the invention is based on a replication process, wherein a prefabricated pattern structure out of a ceramic material is positioned in a processing chamber and carbon is deposited onto said pattern structure.

The pattern structure may consist of a plurality of individual separate elements with multi directional arm orientation abutting at contact points like tripods, tetrapods or other multi-armed elements, star-like structures or the like, and the carbon may grow over these contact points during said deposition process. The enclosing shells of carbon, in particular highly crystalline, partial crystalline graphite or turbostratic graphite or glass-like carbon, replicates the sintering bridges between the ceramic structure, preferably as an entirely covalently bonded graphite layer. A utilization highly porous particle networks of metal-oxide ceramics, which can chemically be reduced by the ambient atmosphere and allows the removal of the metal constitution element within the deposition process. This will allow producing a carbon nanomaterial with outstanding low density and exceptionally high specific mechanical strength in relation to the density of the nanomaterial.

The deposition process may be carried out in a CVD process with injection of a carbon-containing starting material, in particular aromatic hydrogen such as toluene. Said carbon is provided out of the gas phase by injecting the carbon-containing material like toluene into the processing chamber. The carbon-containing material may be injected at predetermined mass flow per time unit. The pattern structure is removed during the depositing process to produce a nanomaterial consisting of pure carbon. Other liquid or gaseous carbon precursors known form chemical vapour deposition processes of graphitic carbon species, e.g. gases like ethen, ethin, propane, methane or solvents like ethanol, benzene, xylene, butanol are suggested to be also feasible.

The pattern structure may consist of a ceramic material, in particular an oxide ceramic, preferably zinc oxide. Whereas zinc oxide may allow complete removal at temperatures below 1000° C., other ceramic materials, in particular ceramic oxides may be used as a prefabricated pattern material to provide other base structures. These other ceramic materials may require higher temperatures to effect a complete removal, up to 1600° C. and more. Other metal-oxide ceramics which can be reduced to a metal residual which can be evaporated by elevated temperatures and therefore can be removed (e.g. by gas flows, cold-trap or evacuation) are suggested to be feasible for the method. Besides already shown use of SnO also MgO, $Al_2O_3$, ZnO, ZrO, $ZrO_2$, SnO, $Sn_2O_3$, $SnO_3$, $TiO_2$, BaO, $Y_2O_3$, CaO could be used for creating a removable network with internal sintering bridges.

The CVD process may be carried out in a reducing atmosphere, in particular in a gas mixture composed of an inert gas and a reducing gas, preferably an argon/hydrogen mixture. Also the presence of cracking products of the used carbon sources can lead to a chemically reducing atmosphere and therefore promote the process. The CVD process may be carried out at from 700° C. to 800° C., preferably from 750° C. to 770° C., in particular at 760° C. Higher temperatures are needed for other metal-oxide ceramics to enable the evaporation of the metal constituent of the used patterned ceramic. The usage of metal-oxide ceramics with relatively low boiling points are suggested to be feasible for described method, e.g. Zn, Ba, Sn, Mg, Al, Ti.

The CVD process may be carried out in at least one first phase in a non-reducing or weakly reducing first atmosphere and in a subsequent second phase in a second atmosphere which is more strongly reducing than the first atmosphere.

The CVD process may be carried out in at least one first phase in a non-reducing or weakly reducing first atmosphere at a first temperature, a subsequent second phase in a second atmosphere which is more strongly reducing than the first atmosphere at a second temperature, and a subsequent third phase in a non-reducing or weakly reducing first atmosphere at a third temperature wherein the second temperature is higher than the first temperature and the third temperature is lower than the second temperature. Herein, the third temperature may preferably be identical to the first temperature. According to this embodiment a second phase is included wherein no carbon containing material is provided to the process chamber wherein the deposition takes place. In this second phase the pattern material is completely removed at an elevated temperature like e.g. 900° C., 1000° C. or even higher up to 1600° C. and more. Having removed any residues of the pattern material in this second phase, additional deposition may take place in the third phase to fill any local defects resulting from said removal in the second phase.

The difference between the first and the second temperature may be at least 100° C., preferably 200° C. and in particular more than 500° C. An increased temperature at the second phase will enhance the removal of the pattern material.

The carbon-containing starting material may be injected at a predetermined injection rate, said predetermined injection rate being a mass flow per time unit and being taken from a table or algorithm correlating said predetermined injection rate with the mass of the ceramic pattern structure, as can be seen in FIG. 2.

If a first type of nanomaterial having a closed shell structure is produced at a first injection rate of the carbon-containing starting material, said carbon-containing starting material may be injected at a second injection rate which is below said first injection rate to produce a nanomaterial having a hollow framework structure, wherein said injection rate is a mass flow per time unit, said closed shell structure is characterized by the carbon containing material completely covering the pattern structure, and said hollow framework structure is characterized by the carbon containing material covering only parts of the pattern structure and establishing solid massive beams interconnected with each other to define a framework.

If a first type of nanomaterial having a closed shell structure is produced at a first injection rate of the carbon-containing starting material, wherein said carbon-containing starting material is injected at a third injection rate which is above said first injection rate to produce a nanomaterial having a filled shell structure, wherein said injection rate is a mass flow per time unit, said closed shell structure is characterized by the carbon containing material completely covering the pattern structure, and said filled structure is characterized by the carbon containing material completely covering the pattern structure and replacing said pattern structure inside the cover.

Generally it is to be understood that the rate of delivery, defined as mass per time unit, may strongly depend on the type of pattern material, the mass of the pattern structure and the density of the pattern structure When using a pattern structure of zinc oxide it has shown to apply an injection rate ranging from 0.25 ml/h toluene per gram of the sample weight up to 20 ml/h per gram of the sample weight to produce a nanomaterial of outstanding low density and high strength and electrical conductivity.

The invention claimed is:

1. A method of producing a nanomaterial, comprising the steps of:
    a) providing a ceramic pattern structure,
    b) depositing carbon from a gas phase onto said pattern structure in a deposition process,
    c) replicating the pattern structure by an entirely covalently bonded graphite layer in said deposition process, and
    d) reducing/removal of ceramic pattern whilst/in course of the deposition process, wherein the pattern structure comprises a plurality of individual separate elements abutting at contact points, and wherein the carbon grows over these contact points during said deposition process.

2. The method according to claim 1, wherein the deposition process is carried out in a CVD process with injection of a carbon-containing starting material.

3. The method according to claim 1, wherein the pattern structure comprises an oxide ceramic.

4. A method of producing a nanomaterial, comprising the steps of:
    a) providing a ceramic pattern structure,
    b) depositing carbon from a gas phase onto said pattern structure in a deposition process,
    c) replicating the pattern structure by an entirely covalently bonded graphite layer in said deposition process, and
    d) reducing/removal of ceramic pattern whilst/in course of the deposition process, wherein the deposition process is carried out in a CVD process in a reducing atmosphere, in particular in a gas mixture composed of an inert gas and a reducing gas, preferably an argon/hydrogen mixture.

5. The method according to claim 4, wherein the deposition process is carried out in a CVD process at from 700° C. to 800° C.

6. A method of producing a nanomaterial, comprising the steps of:
    a) providing a ceramic pattern structure,
    b) depositing carbon from a gas phase onto said pattern structure in a deposition process,
    c) replicating the pattern structure by an entirely covalently bonded graphite layer in said deposition process, and
    d) reducing/removal of ceramic pattern whilst/in course of the deposition process, wherein the deposition process is carried out in a CVD process in at least one first phase in a nonreducing or weakly reducing first atmosphere and in a subsequent second phase in a second atmosphere which is more strongly reducing than the first atmosphere.

7. A method of producing a nanomaterial, comprising the steps of:
    a) providing a ceramic pattern structure,
    b) depositing carbon from a gas phase onto said pattern structure in a deposition process,
    c) replicating the pattern structure by an entirely covalently bonded graphite layer in said deposition process, and
    d) reducing/removal of ceramic pattern whilst/in course of the deposition process, wherein the deposition process is carried out in a CVD process in at least one first phase in a non-reducing or weakly reducing first atmosphere at a first temperature, a subsequent second phase in a second atmosphere which is more strongly reducing than the first atmosphere at a second temperature, and a subsequent third phase in a non-reducing or weakly reducing first atmosphere at a third temperature, wherein the second temperature is higher than the first temperature and the third temperature is lower than the second temperature.

8. The method according to claim 7, wherein the third temperature is identical to the first temperature.

9. The method according to claim 7, wherein the difference between the first and the second temperature is at least 100° C.

10. The method according to claim 2, wherein the carbon-containing starting material is injected at a predetermined injection rate, said predetermined injection rate being a mass flow per time unit and being taken from a table or algorithm correlating said predetermined injection rate with the mass of the ceramic pattern structure.

11. The method according to claim 2, wherein a nanomaterial having a closed shell structure is produced at a first injection rate of the carbon-containing starting material, and said carbon-containing starting material is injected at a second injection rate which is below said first injection rate to produce a nanomaterial having a hollow framework structure, wherein said injection rate is a mass flow per time unit, said closed shell structure is characterized by the carbon containing material completely covering the pattern structure, and said hollow framework structure is characterized by the carbon containing material covering only parts of the pattern structure and establishing solid massive beams interconnected with each other to define a framework.

12. The method according to claim 2,
    wherein a nanomaterial having a closed shell structure is produced at a first injection rate of the carbon-containing start in material,
    wherein said carbon-containing starting material is injected at a third injection rate which is above said first injection rate to produce a nanomaterial having a filled shell structure, wherein said injection rate is a mass flow per time unit, said closed shell structure is characterized by the carbon containing material completely covering the pattern structure, and said filled structure is characterized by the carbon containing material completely covering the pattern structure and replacing said pattern structure inside the cover.

13. The method according to claim 1, wherein the plurality of individual separate elements abut at contact points to form tripods or tetrapods.

14. The method according to claim 2, wherein the carbon-containing starting material is an aromatic hydrogen.

15. The method according to claim 14, wherein the aromatic hydrogen is toluene.

16. The method according to claim 3, wherein the oxide ceramic is zinc oxide.

17. The method according to claim 4, wherein the reducing atmosphere is a gas mixture composed of an inert gas and a reducing gas.

18. The method according to claim 17, wherein the gas mixture is an argon/hydrogen mixture.

19. The method according to claim 5, wherein the deposition process is carried out in a CVD process at from 750° C. to 770° C.

20. The method according to claim 19, wherein the deposition process is carried out in a CVD process at 760° C.

21. The method according to claim 9, wherein the difference between the first and the second temperature is at least 200° C.

22. The method according to claim 21, wherein the difference between the first and the second temperature more than 500° C.

* * * * *

UNITED STATES PATENT AND TRADEMARK OFFICE
CERTIFICATE OF CORRECTION

PATENT NO.        : 10,071,912 B2
APPLICATION NO.   : 13/915971
DATED             : September 11, 2018
INVENTOR(S)       : Karl Schulte et al.

It is certified that error appears in the above-identified patent and that said Letters Patent is hereby corrected as shown below:

In the Claims

Column 12, Line 59, delete "start in" and insert -- starting -- therefor.

Signed and Sealed this
Twenty-first Day of May, 2019

Andrei Iancu
*Director of the United States Patent and Trademark Office*